United States Patent
Coe

(10) Patent No.: US 6,652,256 B2
(45) Date of Patent: Nov. 25, 2003

(54) THREE-DIMENSIONAL MODEL COLORIZATION DURING MODEL CONSTRUCTION FROM COMPUTER AIDED DESIGN DATA

(76) Inventor: Dorsey D. Coe, 626 N. 17th St., Grand Junction, CO (US) 81501

( * ) Notice: Subject to any disclaimer, the term of this patent is extended or adjusted under 35 U.S.C. 154(b) by 0 days.

(21) Appl. No.: 09/963,884

(22) Filed: Sep. 25, 2001

(65) Prior Publication Data

US 2002/0096112 A1 Jul. 25, 2002

Related U.S. Application Data

(60) Provisional application No. 60/244,048, filed on Oct. 27, 2000.

(51) Int. Cl.[7] .............................. B29C 4/22; B29C 4/52
(52) U.S. Cl. ....................... 425/130; 425/166; 425/375; 264/401
(58) Field of Search ................................. 425/130, 375, 425/166; 264/113, 109, 308, 401, 241, 245

(56) References Cited

U.S. PATENT DOCUMENTS

| | | | | |
|---|---|---|---|---|
| 5,121,329 A | * | 6/1992 | Crump ........................ | 700/119 |
| 5,330,799 A | | 7/1994 | Sandor et al. ............... | 427/510 |
| 5,514,519 A | | 5/1996 | Neckers ....................... | 430/269 |
| 5,783,712 A | | 7/1998 | Steinmann et al. .......... | 549/554 |
| 5,932,309 A | | 8/1999 | Smith et al. .................... | 428/46 |
| 6,007,318 A | | 12/1999 | Russell et al. ............... | 425/130 |
| 6,036,910 A | | 3/2000 | Tamura et al. ............... | 264/401 |
| 6,074,742 A | | 6/2000 | Smith et al. ................. | 428/329 |
| 6,129,872 A | | 10/2000 | Jang ............................. | 264/75 |
| 6,165,406 A | | 12/2000 | Jang et al. ................... | 264/308 |

FOREIGN PATENT DOCUMENTS

| WO | WO 97/09168 A1 | 3/1997 | ........... B29C/67/00 |
|---|---|---|---|

OTHER PUBLICATIONS

N. Petillon et al., "Color Stereophotolithography: A Method of 3–D Color Imaging", *Journal of Imaging Science and Technology*, vol. 40, No. 1, pp. 48–55 (published on the front page of the abstract), or pp. 42–49 (handwritten on the front page of document), Jan./Feb. 1996.

P. Jacobs, *Stereo Lithography And Other RP& M Technologies*, ASME book No. 800431, Society of Manufacturing Engineers, pp. 54–55, 1996.

"Reverse Engineering & Inspection–Special Focus", *Time–Compression Technologies*, vol. 9, Issue 2, unidentified page, Apr. 2001.

L. McLean, "Technicolor dream models", [Internet], URL:http://www.manufacturing.net/dn.index/asp?layout=articleWebzine&articleid=CA107865, 1 p., Jul. 17, 2000.

\* cited by examiner

*Primary Examiner*—Robert Davis
*Assistant Examiner*—Joseph S del Sole
(74) *Attorney, Agent, or Firm*—Sierra Patent Group, Ltd.

(57) ABSTRACT

A solid imaging printer for generating colorized three-dimensional models is disclosed. The solid imaging printer comprises a printerhead assembly having a plurality of compartments, at least one of the compartments receives a model building material from an attached conduit, and each of at least three of the compartments retains a differently colored model building material for applying substantially to a surface of a model generated by the solid imaging printer. The solid imaging printer also comprises a controller for directing an application of the model building material and the differently colored model building materials for generating the model by a successive layering of the model building material and the differently colored model building materials. The controller accesses model defining information and directs each of the model building material and the differently colored model building materials to be jetted from the compartments on to the model as it is being generated.

4 Claims, 2 Drawing Sheets

THREE-DIMENSIONAL MODEL COLORIZATION DURING MODEL CONSTRUCTION FROM COMPUTER AIDED DESIGN DATA

CROSS-REFERENCE TO RELATED APPLICATION

The present application claims the benefit of the date of U.S. Provisional Patent Application Serial No. 60/244,048, entitled "Three-dimensional Model Colorization During Model Construction From Computer Aided Design Data", filed on Oct. 27, 2000, which is incorporated herein in its entirety.

BACKGROUND

The present application relates to a method and system to colorize three-dimensional models produced by a printing or layering process. This process is performed when a solid imaging or model building printer, such as a thermojet printer, is supplied with computed aided design data for generating a rapid prototype of a part.

Current solid imaging printers, such as the Thermojet from 3D Systems, Inc., create solid models from computer aided design (CAD) data generally according to the following steps:

Step 1. The CAD data is converted to an industry standard stereolithography (STL) data format.

Step 2. The data for the model represented by the STL file is used to determine data representations of thin (e.g., 0.001 inch) cross sectional layers of the model.

Step 3. Each of the cross sections is converted into a bitmap.

Step 4. Each bitmap is printed onto a platform successively one on top of another for progressively building the model.

Step 5. The resulting model is removed from the platform.

Full color (two dimensional) printing on a planar substrate is traditionally achieved by a four color process method whereby ink for each of the primary colors such as cyan, magenta, yellow, and black, are applied to the substrate in specified or predetermined percentages to produce each desired color of a spectrum of colors. More particularly, such color printing uses 2 to 6 grayscale renderings of the same image in combination, wherein each grayscale image is printed with a different primary color, and it is the combination of these primary colors that gives the appearance of all other colors. In particular, the primary colors may be applied in layers to the planar substrate as needed to achieve the desired coloring. However, there has been no comparable process of printing for colorizing a three-dimensional model generated by, for example, an extrusion process, such as the five step process above that is used with solid imaging printers. In particular, providing full color to such three-dimensional models has previously been performed by applying decals or painting such resulting models after they have been constructed.

The reasons for coloring a three-dimensional model after construction has been at least due to difficulties of manufacture (i.e., the computational complexity of rendering a full spectrum of colors in three dimensions, and the complexity of providing variously colorized model building materials to such a solid imaging printer). For example, an impediment to colorizing three-dimensional model during model generation has been the belief that duplicate substrate delivery systems (one for each primary colored substrate) would be required when building colored models. Accordingly, such duplication would likely require additional heating or melting components, and additional substrate reservoirs. Moreover, such difficulties have previously inhibited development of a process similar to the two dimensional printing process for use in the generation of three-dimensional models. Previously, the contemplated modifications to, for example, the thermojet machine to produce colored three-dimensional models during model construction have been cost prohibitive both by reason of cost to manufacture the models as well as cost of machine operation when compared to the one color rapid prototyping (RP) methods and machines currently being used (in conjunction with, for example, a subsequent step of model painting).

With traditional two dimensional color printing four colored inks (e.g., cyan, magenta, yellow, and black) have been combined to produce a full spectrum of colors. With three-dimensional printing, a fifth model building material (herein also referred to as the "substrate", or "center portion" of a three-dimensional model) is also required to be output (i.e., jetted or sprayed) from the solid imaging printer together with the four primary colors in order for the printer to build the internal structure of the model at the same time that it is applying color to, for example, a relatively thin model thickness (or shell) at the surface of the model. Accordingly, in one naive application of the two dimensional color printing approach to three-dimensional printed models, the printhead assembly for such a solid imaging printer must include at least five printheads: one printhead for each of the four print colors and at least one printhead to output the model building material that provides the bulk of the resulting model. While this is entirely possible, most printhead assemblies of such imaging printers are designed to jet, at most, four different materials. Thus, to jet five different materials increases the complexity of such a three-dimensional imaging printer in terms of size, electronics, material delivery as well as computational complexity and other factors all of which increase the cost of such a machine. Moreover, there is likely increased maintenance and lowered reliability with the additional complexity of an extra printhead. Additionally, the prospect of cost effectively retrofitting currently available four printhead solid imaging printers with a five printheads is unlikely.

Accordingly, it would be desirable to have a method and system for cost effectively colorizing a three-dimensional model as it is being constructed by, for example, a solid imaging printer. Moreover, it would be particularly desirable to have such a method and system, wherein currently available solid imaging printers that generate three-dimensional models in a single color (or colorless) can be easily retrofitted to additionally produce colored three-dimensional models.

SUMMARY

The drawbacks and disadvantages of the prior art are overcome by the three-dimensional model colorization during model construction from computer aided design (CAD) data.

The present application discloses a method and system for coloring a three-dimensional model as it is being constructed by an extrusion process such as is performed by a thermojet printer or other solid imaging printer. In particular, the present application discloses a method and system for coloring the surface of such an extruded model during its construction.

The method and system of the present application may be implemented with a new solid imaging printing machine.

However, in an alternative embodiment (and at least in some contexts a preferred embodiment), the present invention may be performed by retrofitting currently available solid imaging printing machines so that with minimal changes or additions, full color three-dimensional models may be printed (e.g., extruded). For example, in one embodiment that is compatible with the retrofitting of currently available imaging printers, a traditional printhead assembly having a four printhead array of jets is utilized. Currently available imaging printers, such as the Thermojet machine from 3D Systems Inc., utilize such a printhead assembly. However, the four jet arrays are used as a single large array to jet a single colored (or colorless) model building material through the combined jet arrays. The present application utilizes a greater degree of the functionality of such printhead assemblies (with, perhaps, minor enhancements thereto) to generate colorized three-dimensional models.

Moreover, in retrofitting of available solid imaging printing machines consideration is given to keeping color printing production costs of such three-dimensional models low, as well as keeping low the amount of time required to retrofit the currently available solid imaging printing machines.

Additionally, to keep the overhead low for implementing new training and maintenance procedures of field engineers already familiar with existing solid imaging printing machines. Accordingly, in a first embodiment, a combination of software and hardware modifications or add-ons (rather than a total redesign) as a retrofit is provided herein. Moreover, the modifications to existing solid imaging printing machine hardware are minor. In particular, such a printer will continue to function as a "dumb" printer, in that it is unnecessary that the imaging printer distinguish between colors.

Furthermore, the modifications to the software to provide the present invention in an existing solid imaging printer is also minor. For example, the software of a data model preparation module (e.g., a module, possibly remotely linked to the solid imaging printer via a network such as the Internet, wherein the module prepares STL data files for input to the printer) does not need to make distinctions between colors. That is, since currently available imaging printers are able to print many STL models simultaneously without knowledge of colors, such simultaneous model printing can be used to build color models by simultaneously building the following four "sub-models":

(a) a model corresponding to most of the interior of the color model;
(b) a model corresponding to grayscale rendering of the amount (i.e., number of layers) of cyan to be layered at the surface of the color model (the darker the grayscale, the more surface layers of cyan);
(c) a model corresponding to grayscale rendering of the amount (i.e., number of layers) of magenta to be layered at the surface of the color model (the darker the grayscale, the more surface layers of magenta); and
(d) a model corresponding to grayscale rendering of the amount (i.e., number of layers) of yellow to be layered at the surface of the color model (the darker the grayscale, the more surface layers of yellow).

Thus, if such an imaging printer is sent an STL data file describing each of these four sub-models for simultaneously printing, the imaging printer will print (i.e., build) each sub-model simultaneously on the printer platform thereby resulting in the color model being built. Accordingly, a modified embodiment of a currently available imaging printer will continue to print a model, or several models simultaneously. However, for building a color model, each sub-model will be printed through a predetermined different jet array of the imaging printer. Therefore, a new and/or retrofitted solid imaging will simultaneously print all four sub-models (e.g., three grayscale sub-models of the color model and a non-colored interior sub-model of the colored model), but the sub-models will be printed in the same space on the printing platform of the printer.

Thus, the primary software modification necessary for implementing the present invention with a currently available solid imaging printer is a modification to the CAD software so that each of the above described sub-models are represented in, for example, a different STL data file prior to exporting these files to the imaging printer. Therefore, the main modification to the software for retrofitting the present invention to use current printers is an addition and/or enhancement of a pre-processing module to obtain the STL files of the sub-models prior to activating such a printer. In particular, this pre-processing module identifies and separates portions of an image by color at the CAD software workstation as an export filter prior to the creation of an STL file. The four STL files output by the color export filter will have no color information included in them, just as two dimensional color separations have no color information included in them.

It is also an aspect of the present invention that together with at least one of four sub-model STL files, a descriptor or other identification may be exported indicating which sub-model file corresponds to which primary color. Alternatively, predetermined file naming conventions may be used for identifying the color to be used in rendering each sub-model STL file.

Thus, at a high level (and as will be explained more fully in the Detailed Description herein), the following steps are performed by the present invention:

(a) Separate the color data of a full color object, texture map, three-dimensional color scan, etc. into three primary colors and create separate "shell objects" of the primary colors. Shells would be preferred rather than solid objects, as the interior of the color is not needed and the amount of material needed to print a shell is greatly reduced.
(b) Send (or transfer) the shell object data and the primary substrate object data to the printing machine in the same manner as is currently performed, with the main difference being to send each object to a separate printhead, and build the object in the same fashion as is currently performed, with the exception being to build each object in the same three-dimensional space rather than four separate spaces.

BRIEF DESCRIPTION OF THE DRAWINGS

Referring now to the figures, wherein like elements are numbered alike.

DETAILED DESCRIPTION

Those of ordinary skill in the art will realize that the following description of the present invention is illustrative only and not in any way limiting. Other embodiments of the invention will readily suggest themselves to such skilled persons.

The present application is based on the idea that an entire color three-dimensional model does not need to be printed or built in color, i.e., in substantially every application requiring a color three-dimensional model, only the surface or skin thereof requires specified coloring. Accordingly, the amount of colorizing material needed to produce the desired coloring of a three-dimensional model surface is considerably less than the amount required to color the interior of the model as well.

Figure 1:
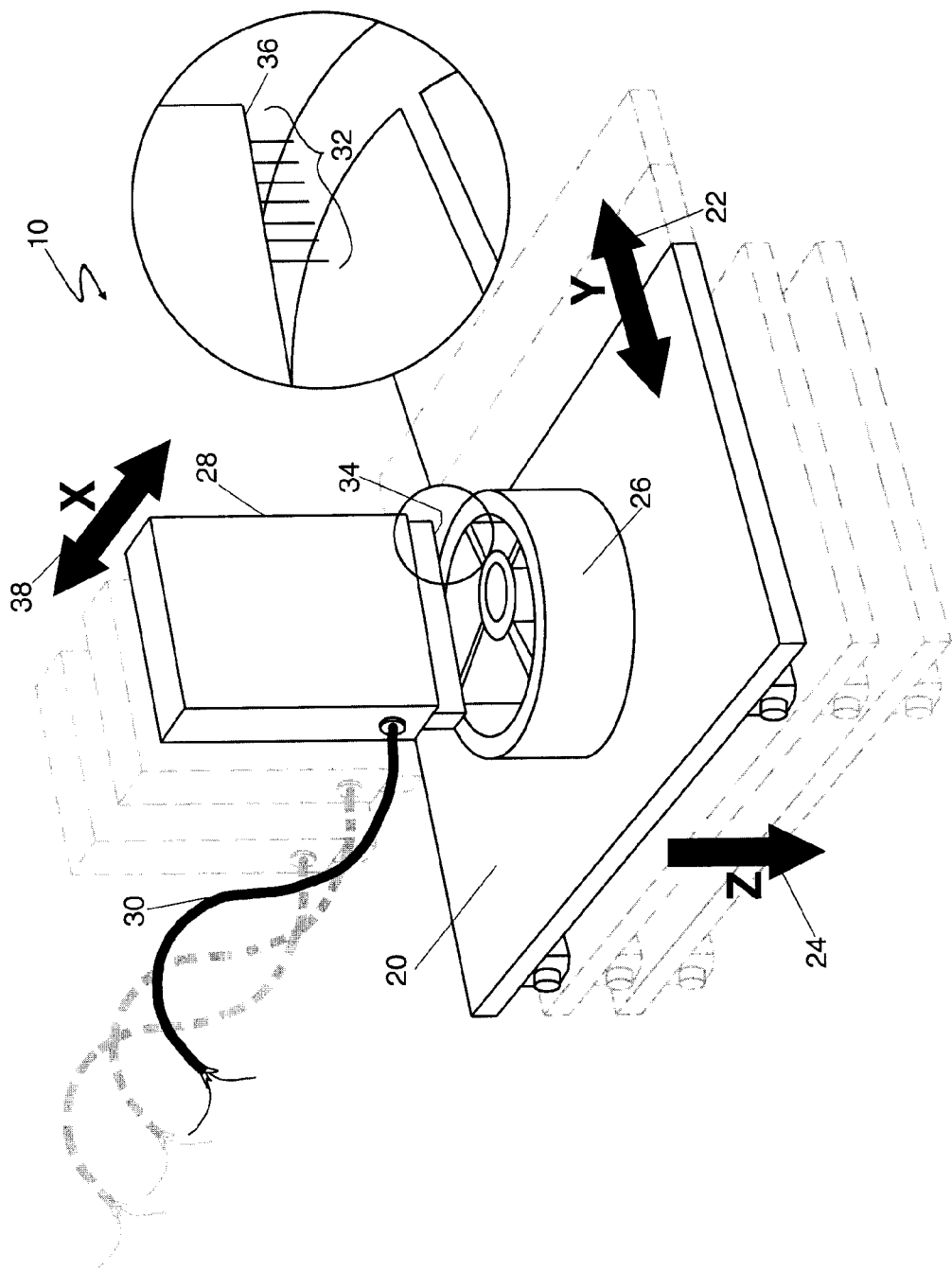
FIG. 1 illustrates a prior art solid imaging printer.

FIG. 1 illustrates a prior art solid imaging printer 10. The printer has a platform 20, which is movable in two dimensions (i.e., the "Y" and "Z" directions as shown by the arrows 22 and 24 respectively) by a controller (not shown in FIG. 1, but represented as a "planar mechanism" 48 in FIG. 2). The platform 20 provides the support upon which a three-dimensional model 26 can be printed. Above both the platform 20 and the model 26 is a printhead assembly 28 for iteratively printing layers of a model building material supplied to the printhead assembly 28 via conduit 30. The printhead assembly 28 includes four printheads therein (not individually shown in FIG. 1, but shown individually as 40a–40d in FIG. 2), wherein each of the printheads outputs one or more sprays (or droplets) 32 of the model building material through an end 34 of the printhead assembly 28. Thus, each printhead receives model building material that has typically been heated to a liquid state so that it can flow through the conduit 30. Moreover, the model building material must remain in a liquid state in order to be sprayed from each of the printheads and subsequently solidify and adhere to the exposed upper surfaces of the model 26. Accordingly, the printhead assembly 28 includes one or more heated model building material reservoirs (not individually shown in FIG. 1) for retaining this material in a heated and pressurized (or vacuous) state conducive to being sprayed. In a typical printhead assembly 28, there is such a separate substrate reservoir for each printhead.

Each printhead further includes a series of one or more jets 36 for outputting the series of one or more sprays 32 from the end 34. For each printhead, the series of jets 36 therefore are adjacent to one another across the length of the end 34 (the length being in the Y direction of arrow 22). Thus, there are four substantially equally spaced series of jets 36 distributed across the end 34, one series of jets 36 per printhead (one such series of jets 36 is illustrated in the magnified portion of FIG. 1).

Accordingly, as the printhead assembly 28 moves in the "X" direction (as shown by the arrow 38) and the platform 20 moves in the "Y" (as shown by the arrow 22) and "Z" (as shown by the arrow 24) directions, the series of jets 36 of the printheads are able to iteratively spray successive layers onto the adjacent most surfaces of the model 26 underneath the printhead assembly 28. Moreover, any combination of printheads can be activated to spray the model building material so that at any given time zero or up to all four of the printheads may be depositing the model building material on the model 26.

Figure 2:
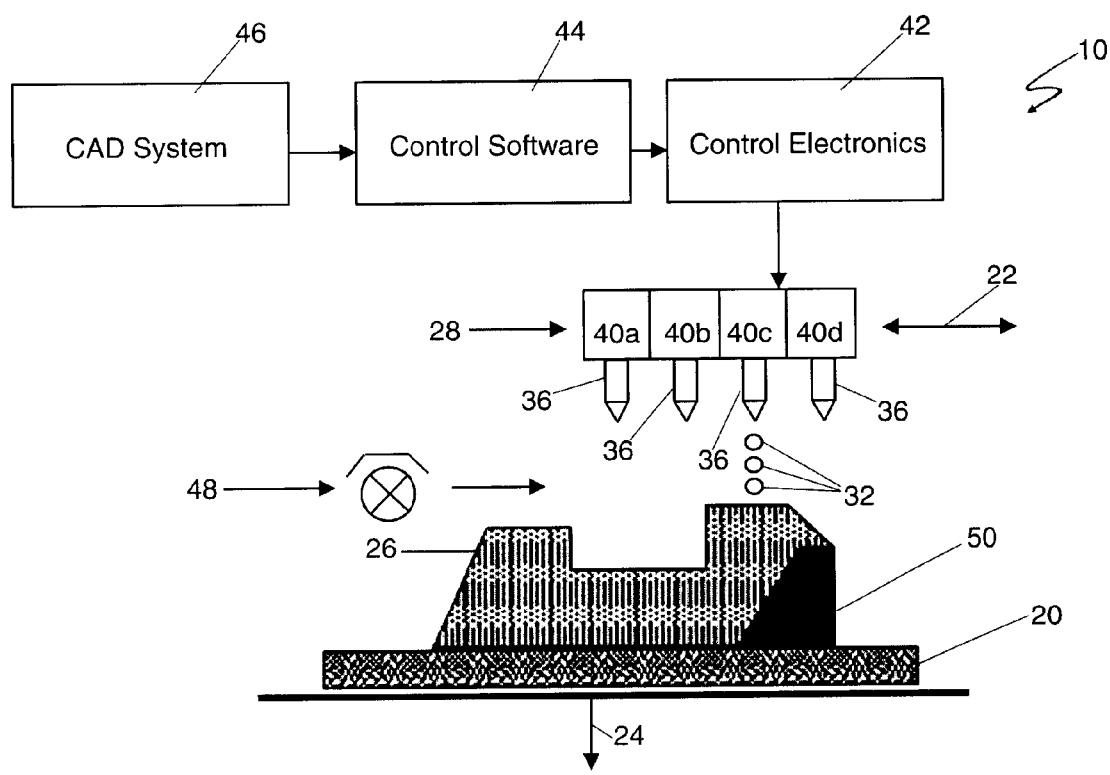
FIG. 2 is a diagram illustrating high level software and electronic components of both the solid imaging printer of prior art FIG. 1 and an enhanced solid imaging printer.

FIG. 2 illustrates a schematic diagram of a prior art solid imaging printer 10, having four individual printheads 40a, 40b, 40c, and 40d of the printhead assembly 28. For simplicity, only a single jet 36 is illustrated depositing the model building material as droplets 32 from each one of the printheads 40a, 40b, 40c, and 40d.

The components that control the solid imaging printer 10, such as the control electronics 42 for controlling the movement of both the platform 20 (via the planar mechanism 48) and the movement of the printhead assembly 28. Additionally represented is the control software 44 directing the control electronics 42, to perform various tasks such as moving the platform 20 a specified amount in a specified direction, moving the printhead assembly 28 a specified amount in a specified direction, activating a specified one or more of the printheads 40a–d for spraying the model building material, and the like. Additionally illustrated is CAD system 46 for generating the data files for building and coloring the model 26. The data path between the CAD system 46 and the control software 44 may include a portion of a network, such as the Internet. An overhang support 50 can also be located on the platform.

In retrofitting a currently available solid imaging printer 10 such as is shown in FIGS. 1 and 2, for the operationalizing present invention, one or more modifications to the printhead assembly 28 of the solid imaging printer 10 may be required. Although the prior art printer 10 uses four printheads 40a–40d, it outputs only the single colored (or colorless) model building material from all four of the printheads.

Another embodiment includes the following modifications to the printhead assembly 28:

(a) Provide (if not already provided) a separate model building material reservoir for each of the printheads 40a–40d;

(b) Attach and direct the conduit 30 to feed only one of the printhead reservoirs, wherein the printhead for this reservoir is for printing the bulk of the interior of the model 26 with model building material that needs no particular color;

(c) Attach to the top of the three other reservoirs lids and seals so that there is one reservoir for each of a small quantity of colored model building material, and more particularly, one of these reservoirs for each of, for example, a cyan colored model building material, a magenta colored model building material, and a yellow model building material (or another set of three primary colors); and (d) Additionally, such retrofits may require some ancillary electrical/data modifications to support the above described printhead assembly 28 modifications.

The present invention requires minimal modifications to the model building material feed systems of presently available solid imaging printers 10. A model building material feed system (not shown) is modified such that the existing bulk material feed system using, for example, a white liquid model building material is attached to only one (e.g., 40a) of the four printheads reservoirs and the other three printheads are only attached to other three small reservoirs residing directly, for example, on the top of these other three printheads (e.g., 40b, 40c, and 40d). The bulk substrate feed (not shown), bulk melter (not shown), axis movement systems (i.e., planar mechanism 48) and the majority of the remainder of the printer 10 function as originally designed, as one skilled in the art will understand. Accordingly, just as in the non-modified printhead assembly 28, air is used to either pressurize or vacuum the model building material in the reservoirs and force this material (colorized and non-colorized) onto the model 26 and/or the platform 20 through the corresponding printhead 60. Additionally, note that each colorized version of the model building material maybe in solid form prior to being, for example, manually placed in its corresponding reservoir. Alternatively, an amount of the non-colorized model building material may be combined in such reservoir with a die for colorizing the model building material within its heated reservoir.

In generating a three-dimensional model with an imaging printer, it is often the case that more than 1,000 times the amount of ink needed for a two dimensional print is required. Thus, an imaging printer according to the present invention may, in some embodiments, also utilize an oversized substrate reservoir and additional substrate heating and/or melting components.

Thus, such a retrofit of a printer 10 is able to substantially utilize the existing heating, material storage, and electrical components incorporated of currently available printhead assemblies provided by manufacturers as one skilled in the art will appreciate.

As indicated in FIG. 2, the software typically includes a CAD system 46 and control software 44, wherein these two software components may communicate via a communications network. Accordingly, in such a configuration, the CAD system 46 (and any other co-located auxiliary components such as the pre-processing module identified herein above) may be referred to as the "client side" system(s) for model building via a (modified or otherwise) printer 10. Conversely, the control software 44 (and any other co-located auxiliary software components) may be referred to as the "server side" system(s) for model building with a co-located (modified or otherwise) printer 10.

On the "server side", the current way in which three-dimensional models are built with a solid imaging printer 10 remains functionally the same as in the retrofitted version embodying the present invention. However, the only addition or change to such "server side" software is the introduction of software for identifying and utilizing an STL file name convention (or other distinguishing technique such as data descriptors within the files) that allows the "server side" software to recognize and distinguish between the STL data files for the different sub-models (as described in the SUMMARY Section above). Thus, for example, a data file for each sub-model may be identified by its file name.

Present practice in the art is to name data files defining support structures for models with a suffix of "_s". Thus, if the data file for a model (or portion thereof) is named with the "_s" as a suffix to its file name, the printer 10 will interpret it as being a data file for defining a support structure for a corresponding model. Moreover, it is typical that the control software 44 for such imaging printers 10 build such support structures hollow since only enough substrate is used in building such a support structure as is needed to effectively support the model while it is being concurrently built. Accordingly, this technique of using a file name suffix to inform the control software 44 whether to build an object as solid or hollow together with the capability of building a plurality of such objects concurrently can be utilized to enable the present invention. That is, in one embodiment, the control software 44 may be modified to recognize additional file name suffixes of the form "_x.stl" on data file names received from, for example, the CAD system 46. For example, a model data file (having the data defining a desired model or part) may be created with and subsequently identified by a suffix of "_1.stl" appended to the file name.

Accordingly, the software controller 44 can then interpret such a file as having model data wherein the entire interior to the model is printed (i.e., filled with model building material). Moreover, the control software 44 may associate such model data with only the predetermined printhead that receives model building material via the conduit 30. Additionally, it can be assumed that there are grayscale sub-model data files (e.g., for each of cyan, magenta, and yellow) for the model and that there are different file name suffixes for each of these grayscale sub-model data files as well (e.g., such as "_2.stl" for the cyan grayscale sub-model, "_3.stl" for the magenta grayscale submode, and "_4.stl" for the yellow grayscale sub-model). In this case, the control software 44 can be modified so that each such file name suffix is associated with exactly one of the printheads 40a–40d of the printhead assembly 28. For example, assuming printhead 40a receives the substrate from the conduit 30, then the control software 44 will assign data files having a "_1.stl" suffix to be printed by is printhead 40a. Additionally, the control software 44 can assign data files having a "_2.stl" suffix to be printed by printhead 40b, assign data files having a "_3.stl" suffix to be printed by printhead 40c, and assign data files having a "_3.stl" suffix to be printed by printhead 40d.

Thus, in using this file naming convention (or any other similar conventions) then color three-dimensional models may be generated in a conventional manner with minor modifications to the control software 44. That is, the control software 44 may be modified so as to execute the programs that build hollow structures, such as the model supports described above, when a data file has suffix identifying a data file for a primary color grayscale sub-model (e.g., cyan, magenta, or yellow), and execute the programs for building a non-hollow or solid object otherwise.

On the "client side", the data model preparation module (which includes the pre-processing module mentioned above) remains functionally the same in that it prepares STL data files for model building by a solid imaging printer. However, the present invention also includes modifications to such modules. In particular, one such modification includes specifying different data model (i.e., STL) files for each of the four different printheads 40a–40d of the printhead assembly 28. In particular, this may be accomplished by the naming convention discussed above, or a switch or flag in the data file header, or other ways known in the art, if needed. However, it is within the scope of the present invention that the assignment as to which printhead builds which sub-model can be determined on either the "client side" or the "server side", or, on both sides (e.g., a default assignment on the "client side" and a default over ride on the "server side"). In one preferred embodiment, the "server side" may determine such assignments.

Moreover, in one embodiment, such data model preparation modules on the "client side" use the existing conventions for naming data model files, wherein a data model file named "part_stl" is interpreted differently than a data model file named "part_s.stl". Accordingly, for a data model preparation module for the present invention, three additional "color" data model files may be output. The additional data model files may be a data file for printing cyan (e.g., having a file name suffix of "_c.stl"), a data file for printing magenta (e.g., having a file name suffix of "_m.stl"), and data file for printing yellow (having a file name suffix of "_y.stl"). Thus, when the control software 44 receives files with such suffixes, it will associate these file names with a corresponding printhead. The original data model CAD file, from which the corresponding grayscale sub-model data files are derived, is still provided to the printer (regardless of the technique for assigning the sub-model data files to their particular printheads) since this file provides the model data for depositing the base model building material (which is not colored, i.e., white or opaque).

An important modification of the "client side" software is provided by a novel software subsystem referred to as an "STL color export filter" (or simply "filter"). The STL color export filter is designed to be used with a particular (or several) three-dimensional rendering or CAD packages. The function of the STL color export filter is to create from a CAD three-dimensional model both an STL data file corresponding to the three-dimensional CAD model (as is currently performed in the art), and STL data files for one or more textures or image maps corresponding to, for example, the color of the surfaces of the CAD three-dimensional model within the CAD or three-dimensional package.

These STL data files for textures or image maps may be considered as generalizations of the sub-model data files described above, in that in addition to model surface color characteristics, the data defining various surface patterns may by also provided therein. Such STL data files for textures or image maps are referred to as "shells" (a model skin having a relatively shallow depth into the interior of the model, and accordingly being substantially hollow). The data files for these "shells" may be processed similarly to support files currently used to generate model supporting structures during the solid model building process.

Currently three-dimensional CAD and three-dimensional image mapping software, such as 3D Studio by Autodesk Inc., apply color images to the surfaces of three-dimensional models (inside computer software only, no physical parts) in a fashion known as "mapping". For example, the mapping procedure assigns a coordinate in the image to each vertex of the three-dimensional object. In this example, a selected two dimensional image is applied to the surface of a three-dimensional model (e.g., wrapping a two dimensional logo on to a coffee mug). For instance, colored images or photographs may be mapped to the exterior of a three-dimensional object using the CAD space coordinates of the object as reference points or coordinate system.

The coordinate systems are the geometric relation used to denote the location of points in three-dimensional space. The most common is the rectangular coordinate system, whereby points are located by traversing the x, y and z axes of three-dimensional space. Normally, the origin of a coordinate system is defined as 0,0,0 though this is not required, as one skilled in the art will understand. Accordingly, each pixel of the mapped image is "wrapped" onto a surface of the three-dimensional object, and the CAD space values (i.e., modeling space coordinates) are stored for both the position of the object and the image mapped to it. Concurrently, the color value of each pixel of an image mapped to an object is also stored.

Each such CAD space value or point is referred to as a vertex. A vertex is generally defined as three coordinates separated by commas, one each for the x, y, and z coordinate axes denoting the location of the vertices in three-dimensional space. A two dimensional computer bitmap image is a photographic image composed of pixels or picture elements defined in two dimensional space (x, y coordinates only). Each pixel of a bitmap image is defined as a color value composed of, for example, a number between 0 and 255 for each of the colors red, green, and blue. In this case, 0 represents the darkest or least illuminated portion of a color (black), and 255 represents the lightest or most illuminated portion of a color (white). Red green and blue values are used to display images on a computer screen, however these values must be converted or interpreted into values used for printing inks.

These values are commonly referred to as cyan magenta and yellow (CMY). CMY values are represented in percentages of luminosity from light to dark with 0% being white (255 in RGB), 50% equal to medium gray (128 in RGB), and 100% equal to black (0 in RGB). In one embodiment, the following steps (A–C) may be performed to separate the color values (i.e., for cyan, magenta and yellow) of a bitmap images into individual STL files:

(A) Convert the RGB color values mapped to an object by three-dimensional CAD software into cyan, magenta, and yellow (CMY) color percentage values in the same fashion as is performed by popular image editing and color separation software, such as Adobe Systems Photoshop.

(B) Perform a Boolean subtraction in the CAD system 46, wherein for a given surface area resolution surface pixels, and for each color (C) (cyan, magenta and yellow), the CAD object has subtracted therefrom a second CAD object that is interior to the initial CAD object and wherein at each surface pixel (P) of the initial CAD object, the second CAD object has a corresponding surface pixel P0 that is offset from P toward the interior of the initial CAD object in a surface normal direction at P. In particular, each such offset is to a depth varying directly with a color value percentage (i.e., color saturation) of the bitmap pixel for the color C. For instance, a 1% color value percentage may correspond to an offset of 0.001 inches, a 50% color value percentage may correspond to an offset of 0.05 inches, and a 100% color value percentage may correspond to an offset of 0.1 inches.

(C) Export the results of each Boolean subtraction as a separate STL file in the same manner as is currently utilized by CAD software for three-dimensional objects applying the corresponding suffix (e.g., "c.stl", "m.stl", or "y.stl") to each data file name to correspond with the color value used to subtract the object from the original of either cyan magenta or yellow.

This process can be illustrated as follows. A computer picture is composed of pixels or picture elements. The corresponding three-dimensional model is built from drops of the liquid model building material (having a composition similar to "wax") that hardens. If the resolution of the three-dimensional model was determined to be 300 dots or drops per inch (dpi), then the maximum resolution for the image to be applied to the skin of the model should be fixed at (or no larger than) 300 dpi along the x or y axis (x and y axes here corresponding to the x and y axes of, for example, FIG. 1). If the model is determined to be sliced at a resolution of 1000th of an inch thickness (along the z axis), then the resolution of the color bitmap in the z direction should not exceed 1000 dpi.

Perhaps for simplification, the initial embodiment of the export filter could call out 600×600×600 dpi parts (x, y, z dimensions) and 600×600 dpi images (x, y dimension) to correspond. Lower or higher resolution images applied to a model may be extrapolated or interpolated to the correct resolution before creation of the STL files. This type of software definition could then be released to different CAD vendors in order to let the CAD vendor write the actual export filters for their software as they do currently with the standard STL file export definition.

The materials utilized in the present invention need to be modified. In one embodiment, the model building materials from which three-dimensional models may be constructed are substantially the same as the model building materials used in current solid imaging printers, except that in the present invention three differently colored versions of such a model building material is used. For example, the model building material may be provided in the three primary colors of cyan, magenta and yellow.

Moreover, providing the three colored versions of the model building material is a simple process of adding the correct dye formulation to the typically white model building material currently in use. Black colored material is not needed for the present invention since the three primary colors mixed produce a near perfect black. In traditional two dimensional printing where the ink thickness on a page is so thin (e.g., about 100 microns) that the page color shows through the ink, black is used to hide the paper color. In the present invention, the colored material would predominately hide the white since the colored material is applied in drop size or thickness (e.g., about 0.004 inches to about 0.008 inches).

Additionally, the amount of colored material needed depends upon geometry of a three-dimensional model's surface area. However, in general it is believed that the amount of colored material required for coloring the surface of the model is about 1/100 of the amount of the model building material required to construct the entire model.

Moreover, since the amount of colored material may be considered to be approximately the same (e.g., one primary colored material used at the rate of no more than twice any other colored material), the amount of any one of the primary colored materials for coloring a model having a surface area of, for example, about four inches square, will typically fit in a very small cartridge. This is compared to the amount of material in the substrate reservoir used to build the internal solid structure of the model. Thus, the small amount of the colored model building material typically required allows for placement of the model building material reservoirs directly over the printheads, as described above.

Utilizing the method of skin (or shell) printing according to the present invention, specialized external model building materials could be used (instead of color or in conjunction with color) for applying to the exterior surface of a three-dimensional model being printed. For example, model building materials may be utilized that are designed to resist breaking, induce electrical conductivity, resist degrading with increased heat and/or cold, resist corrosion by certain chemicals, and the like. This method also allows internal part structures to obtain the exterior materials, if desired, and the possibilities are almost endless and unknown (this process can be extended to build internal skins or "parts inside of parts" for the purpose of electrical connections, to increase part strength, and the like).

It is common practice in the art to plan off a small amount of each layer deposited when generating a three-dimensional model with a "planarizer. Planarizing 30% of the model building material of each layer off the model surface may induce color streaks or distort the colors. The present invention prints the colors in a specific order according to the density of the color. That is, since magenta is the darkest of the three primary colors it is printed first, then cyan, and then yellow. Also, if no color is specified, then the white of the model building material is provided. Thus, the planarizer will wipe the least contributive color (e.g., yellow and white) off of the top of each layer either intermittently or after the application of every layer to the model since these colors are minor contributors to the more rich or darker colors. Also, it may be desirable to increase the layer thickness slightly and reduce the percentage of material scraped off of each layer, since models built with color may have a more aesthetic function, whereas models built in one color are generally built to be cast and need tighter dimension tolerances. Models built in color may be created as a final product. Models built in one color are designed to be either disposable (e.g., as a product of a rapid prototyping step in the process for manufacturing a part) or to be for casting many parts from a mold created by the one color model.

In one embodiment, the following software was used to implement the invention:

(a) Photoshop by Adobe Systems Inc. This software package was used for color separation and image size modification.

(b) Streamline, by Adobe Systems Inc. This software package was used for intermediate conversion of color data in bitmap form converted to vector based data for CAD program recognition.

(c) Rhinoceros Nurbs modeling Software, from Robert McNeil and Associates for creating three-dimensional objects, and extrusion of the two dimensional vectors created in Streamline into the third dimension along the z axis, and Boolean addition and/or subtraction of three-dimensional geometries.

(d) 3D LightYear, by 3D Systems, Inc. for adding the "_s" to the file name causing the software to interpret a sub-model as a support and therefore not a solid structure, but instead only a shell.

(e) 3D Studio Max, by Autodesk Inc for creating three-dimensional objects, and mapping two dimensional full color photographs to the skin of three-dimensional objects.

Additionally, the present invention may be particularly useful in:

(a) manufacturing of prototypes for toys, medical equipment, topographical maps;

(b) the replication of any object to duplicate its form or likeness, such as a celebrity or an ancient artifact, or geological find;

(c) to duplicate any existing physical object out of a less expensive material than the original is composed of, or to duplicate any object wherein multiples of that object cannot be obtained, (one of a kind items);

(d) to replicate the internal structures in full color detail of living entities such as animals or humans, for display or scientific instruction, purpose;

(e) to replicate in a "frozen" or static form data that is captured from singular or plural "short events" such as explosions/implosions, tornadoes, clouds and other atmospheric phenomena; and (f) to replicate objects either too large or small to be seen with the naked eye at a size one could easily perceive, such as stellar or microscopic bodies from galaxies to DNA pattern structure.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A solid imaging printer for generating colorized three-dimensional models, comprising:

a printerhead assembly having a plurality of compartments, at least one of said compartments receives a liquid interior model building material from an attached conduit, and each of at least three of said compartments retains a differently colored liquid model building material for applying substantially to a surface of a model generated by said solid imaging printer;

a processor configured to process three-dimensional model data in operative communication with said printerhead assembly; and a controller for directing an application of said liquid interior model building material and said differently colored liquid model building materials for generating said model by a successive layering of said liquid interior model building material and said differently colored liquid model building materials, wherein said controller is configured to direct each of said liquid interior model building material and said differently colored liquid model building materials to be jetted from said compartments on to a building platform in response to said three-dimensional model data;

wherein said differently colored liquid model building materials create a plurality of shell objects; and wherein an interior of said model is said liquid interior model building material.

2. The solid imaging printer of claim 1, wherein at least three of said differently colored model building materials are three primary colors.

3. A solid imaging printer for generating a three-dimensional model, comprising:

a printerhead assembly having a plurality of compartments, at least one of said plurality of compartments configured to receive a core liquid model building material, and at least one of said plurality of compartments configured to receive at least one shell liquid model building material;

a processor configured to process three-dimensional model data in operative communication with said printerhead assembly; and a controller configured to direct said core liquid model building material and said shell liquid model building material to generate the three-dimensional model, said three-dimensional model comprises successive layers of a core portion and an exterior shell portion adjacent said core portion, said controller configured to direct in successive layers said core liquid model building material to said core portion in response to said three-dimensional model data, said controller configured to direct in successive layers said shell liquid model building material to said shell portion in response to said three-dimensional model data.

4. The solid imaging printer of claim 3, wherein at least three of said shell liquid model building materials are three primary colors.

* * * * *